US008211352B2

(12) United States Patent
Baca et al.

(10) Patent No.: US 8,211,352 B2
(45) Date of Patent: Jul. 3, 2012

(54) ELECTROSPINNING PROCESS FOR ALIGNED FIBER PRODUCTION

(75) Inventors: Adra Smith Baca, Rochester, NY (US); Dean Michael Thelen, Addison, NY (US)

(73) Assignee: Corning Incorporated, Corning, NY (US)

( * ) Notice: Subject to any disclaimer, the term of this patent is extended or adjusted under 35 U.S.C. 154(b) by 243 days.

(21) Appl. No.: 12/507,116

(22) Filed: Jul. 22, 2009

(65) Prior Publication Data

US 2011/0018174 A1    Jan. 27, 2011

(51) Int. Cl.
| B29C 47/00 | (2006.01) |
| B29C 47/88 | (2006.01) |
| H05B 7/00 | (2006.01) |
| B28B 3/20 | (2006.01) |
| B28B 17/00 | (2006.01) |

(52) U.S. Cl. ............ 264/465; 264/484; 264/176.1; 264/211.12; 425/174.6

(58) Field of Classification Search ............ None
See application file for complete search history.

(56) References Cited

U.S. PATENT DOCUMENTS

| 3,169,899 | A | * | 2/1965 | Steuber .................. 428/198 |
| 3,319,309 | A | * | 5/1967 | Owens ........................ 19/29 |
| 3,689,608 | A | * | 9/1972 | Hollberg et al. ............ 264/441 |
| 3,851,023 | A | * | 11/1974 | Brethauer et al. .......... 264/441 |
| 3,860,369 | A | * | 1/1975 | Brethauer et al. ............. 425/3 |
| 4,233,014 | A | * | 11/1980 | Kinney ............... 425/174.8 R |
| 4,689,186 | A | * | 8/1987 | Bornat ......................... 264/6 |
| 5,024,789 | A | * | 6/1991 | Berry .......................... 264/6 |
| 5,295,172 | A | * | 3/1994 | Liu ............................ 377/15 |
| 6,110,590 | A | * | 8/2000 | Zarkoob et al. ............. 428/364 |
| 6,520,425 | B1 | * | 2/2003 | Reneker ..................... 239/294 |
| 6,616,435 | B2 | * | 9/2003 | Lee et al. ................... 425/83.1 |
| 6,641,773 | B2 | * | 11/2003 | Kleinmeyer et al. ........ 264/452 |
| 6,656,394 | B2 | * | 12/2003 | Kelly ......................... 264/10 |
| 6,695,992 | B2 | * | 2/2004 | Reneker ..................... 264/29.1 |
| 6,709,623 | B2 | * | 3/2004 | Haynes et al. ............... 264/465 |
| 6,713,011 | B2 | * | 3/2004 | Chu et al. ................... 264/465 |
| 6,753,454 | B1 | * | 6/2004 | Smith et al. ................. 602/41 |
| 6,991,702 | B2 | * | 1/2006 | Kim ........................ 156/379.6 |
| 7,105,058 | B1 | * | 9/2006 | Sinyagin .................... 118/713 |
| 7,105,124 | B2 | * | 9/2006 | Choi ......................... 264/465 |
| 2009/0108503 | A1 | * | 4/2009 | Scott-Carnell et al. ...... 264/484 |
| 2009/0152773 | A1 | | 6/2009 | Barinov et al. ............. 264/465 |
| 2009/0162468 | A1 | * | 6/2009 | Barinov et al. ............. 425/145 |

FOREIGN PATENT DOCUMENTS

| EP | 2045375 A1 | 8/2009 |
| KR | 10-0619186 B1 | 8/2006 |
| WO | 2007-086910 A2 | 8/2007 |
| WO | 2008/020326 | 2/2008 |

(Continued)

OTHER PUBLICATIONS

Wu et al., Control of electospun mat width through the use of parallel auxillar electrodes, Polymer, Jul. 18, 2007, vol. 48, Issue 19, pp. 5653-5661.*

(Continued)

*Primary Examiner* — Christina Johnson
*Assistant Examiner* — Benjamin Schiffman
(74) *Attorney, Agent, or Firm* — Michael W. Russell (57) ABSTRACT

An electrospinning process and apparatus for forming aligned electrospun fibers. A time-dependent (AC) voltage is applied to a multi-electrode collector in order to temporally control the location and orientation of fiber deposition.

12 Claims, 8 Drawing Sheets

FOREIGN PATENT DOCUMENTS

| | | |
|---|---|---|
| WO | 2008-102538 A1 | 8/2008 |
| WO | 2008/106381 | 9/2008 |

OTHER PUBLICATIONS

Sarkar et al., Biased AC Electospinning of Aligned Polymer Nanofibers, Macromolecular Rapid Communications, Apr. 24, 2007, vol. 28, Issue 9, pp. 1034-1039.*

Geun Hyung Kim, Electrospinning Process USing Field-Controllable Electordes, Journal of Polymer Science Part B: Polymer Physics, Apr. 7, 2006, vol. 44, Issue 10, pp. 1426-1433.*

"Nanofiber spraying method using a supplementary electrode"; Kim et al; 2006 American Institute of Physics; Applied Physics Letters 89, 013111 (2006).

"The use of AC potentials in electrospraying and electrospinning processes"; Kessick et al; Science Direct; Polymer 45 (2004) 2981-2984.

"Electrospinning of Polymeric and Ceramic Nanofibers as Uniaxially Aligned Arrays"; Li et al; Nano Letters, 2003; vol. 3, No. 8; 1167-1171.

"High Precision Deposition Electrospinning of nanofibers and nanofiber nonwovens"; Hellmann et al; Polymer 50 (2009) 1197-1205.

* cited by examiner

ELECTROSPINNING PROCESS FOR ALIGNED FIBER PRODUCTION

BACKGROUND AND SUMMARY

The present disclosure relates to a process and apparatus for producing aligned electrospun fibers, and more specifically to a process and attendant apparatus for forming electrospun fibers having nanoscale or micron-scale dimensions.

Electrospinning, which shares characteristics of both electrospraying and conventional solution dry-spinning of fibers, is a fiber-forming process that uses an electric charge to draw micron- or nano-scale fibers from a liquid feedstock. Advantageously, the process is non-invasive and does not require the use of coagulation chemistry or high temperatures to produce solid threads. These aspects make the process particularly well-suited to the production of fibers using large and complex molecules. Solventless electrospinning from molten precursors can also be performed, ensuring that no solvent is retained in the final product.

A conventional laboratory setup for electrospinning comprises a spinneret (typically a hypodermic syringe needle) connected to a high-voltage (5 to 50 kV) direct current (DC) power supply, and a grounded collector plate. A liquid feedstock (e.g., solution, suspension, melt, etc.) is passed through the needle tip using, for example, a syringe pump or a header tank that can provide a constant feed velocity, feed pressure, etc. The constant pressure feed, which is associated with the header tank, can be advantageous for lower viscosity feedstocks.

When a sufficiently high voltage is applied to a liquid droplet, the body of the liquid droplet is charged, electrostatic repulsion counteracts the surface tension, and the droplet is stretched. At a critical point, a stream of liquid erupts from the droplet surface and forms a so-called Taylor cone.

If molecular cohesion of the liquid is sufficiently weak, the stream of liquid will break up into a plurality of droplets as the droplets are electrosprayed. On the other hand, if molecular cohesion of the liquid is sufficiently strong, stream breakup does not occur and a charged liquid jet is formed. The liquid jet may be attracted to other electrically charged objects at a suitable electrical potential.

As the jet dries out in flight, the mode of current flow changes from ohmic to convective as charge migrates to the surface of the fiber. The jet is elongated by a whipping process caused by electrostatic repulsion initiated at small bends in the fiber, and finally it is deposited on the grounded collector. The elongation and thinning of the fiber resulting from this bending instability can lead to the formation of fibers having a uniform diameter.

Applications for electrospun fibers include catalysis, filtration media, filler for fiber-containing composites, and scaffolds for tissue engineering. However, some fiber applications can be limited by the deposition pattern of the resulting fiber mat. Notably, alignment of the as-spun fibers would increase the number of applications for which the fibers were suited. Optical polarizers, for example, could be made using aligned fibers. Accordingly, it would be advantageous to provide a high-yield electrospinning process capable of providing aligned fiber collection and control over fiber dimensions while maintaining compatibility with a broad range of fiber-forming materials.

These and other aspects and advantages of the invention can be achieved via a fiber formation process that comprises forming a fiber stream comprising an electrically conductive fluid, the fiber stream being formed by a fiber-forming module that is biased at a first DC voltage, directing the fiber stream at a collector, the collector comprising a plurality of electrodes each electrically biased at a second DC voltage, attracting the fiber stream to successive ones of the electrodes by varying a time-dependent voltage applied to at least one of the electrodes, and depositing the fiber stream between successive pairs of the electrodes such that the deposited fibers are aligned between respective electrode pairs.

An apparatus for forming aligned electrospun fibers comprises a fiber-forming module, a fiber-collecting module having a plurality of electrodes, and a time-dependent voltage power supply, wherein the time-dependent voltage power supply is configured to provide a time-dependent voltage to one or more of the electrodes.

Additional features and advantages of the invention will be set forth in the detailed description which follows, and in part will be readily apparent to those skilled in the art from the description or recognized by practicing the invention as described herein, including the detailed description which follows, the claims, as well as the appended drawings.

It is to be understood that both the foregoing general description and the following detailed description present embodiments that are intended to provide an overview or framework for understanding the nature and character of the invention as it is claimed. The accompanying drawings are included to provide a further understanding, and are incorporated into and constitute a part of this specification. The drawings illustrate various embodiments and together with the description serve to explain various principles and operations.

DETAILED DESCRIPTION

The current disclosure relates generally to an electrospinning process and an attendant apparatus for forming aligned electrospun fibers. The process and apparatus temporally control the location and orientation of fiber deposition by applying a time-dependent (e.g., AC) voltage to a multi-electrode (i.e., multi-contact) collector. By applying a distinct, time-dependent voltage to one or more electrodes, the electrode to which the fibers are most electrically-attracted changes with time, which, as the fibers are drawn to the electrodes, can induce alignment of the fibers.

As used herein, a time-dependent voltage is any voltage that varies as a function of time. A particular example of a time-dependent voltage is an AC voltage, which typically comprises a voltage that changes polarity at regular intervals. In the various embodiments disclosed herein, reference may be made to an AC voltage or to an AC power supply. It should be appreciated that while these various embodiments are described with respect to an AC voltage, any other time-dependent voltage may be used as well.

Figure 1:
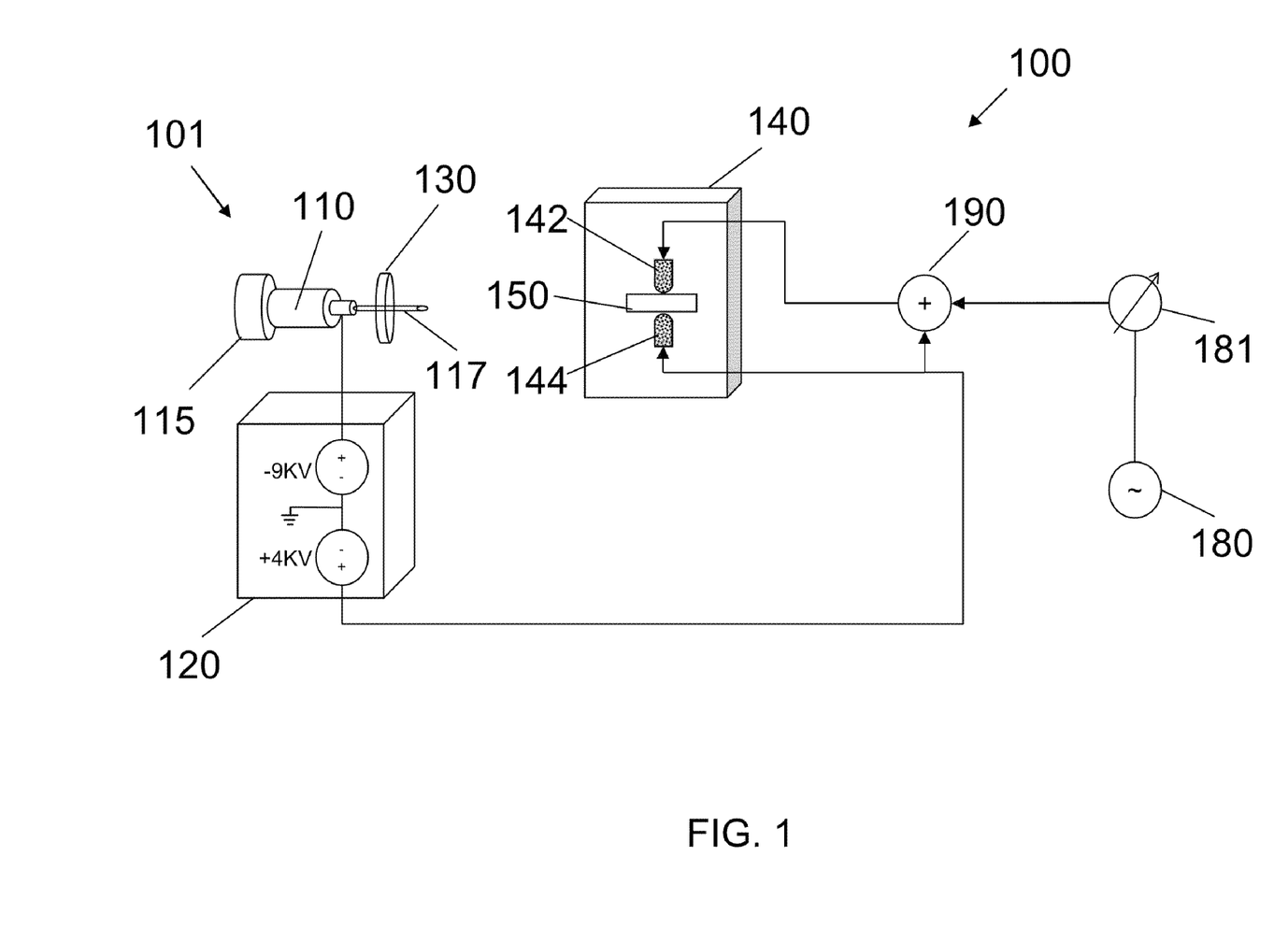
FIG. 1. is a schematic illustration of an electrospinning test setup used to form linearly-aligned fibers.

FIG. 1 is a schematic illustration of an electrospinning test apparatus 100 used to form linearly-aligned fibers according to one embodiment. In fiber-forming module 101, a liquid feedstock 110 is pumped using syringe pump 115 to dispensing needle 117 that is connected to a multi-DC power supply 120. The formed fiber 130 travels to a collector 140 where it is attracted by either upper electrode 142 or lower electrode 144 depending upon the instantaneous polarity of an applied AC voltage. By placing the upper and lower electrodes proximate to a substrate such a glass substrate 150, the fiber 130 can be linearly-aligned between the upper and lower electrodes on the glass substrate 150.

As illustrated in the FIG. 1 embodiment, the fiber 130 can be directed substantially horizontally toward the collector 140. In alternate embodiments, the fiber-forming module and collector can be arranged such that the fiber is directed in a non-horizontal plane toward the collector. For example, the fiber can be directed at an oblique angle or substantially vertically toward the collector.

In FIG. 1, the multi-DC power supply 120 is connected to lower electrode 144. The multi-DC power supply is also connected to upper electrode 142 via isolation transformer 190. In order to control electrode polarity, a single-phase 120V AC supply 180 is connected to upper electrode 142 via a variable transformer 181 and isolation transformer 190. The isolation transformer is used to couple an AC neutral signal, the single-phase AC supply and the DC supply to the upper electrode 142.

Figure 2:
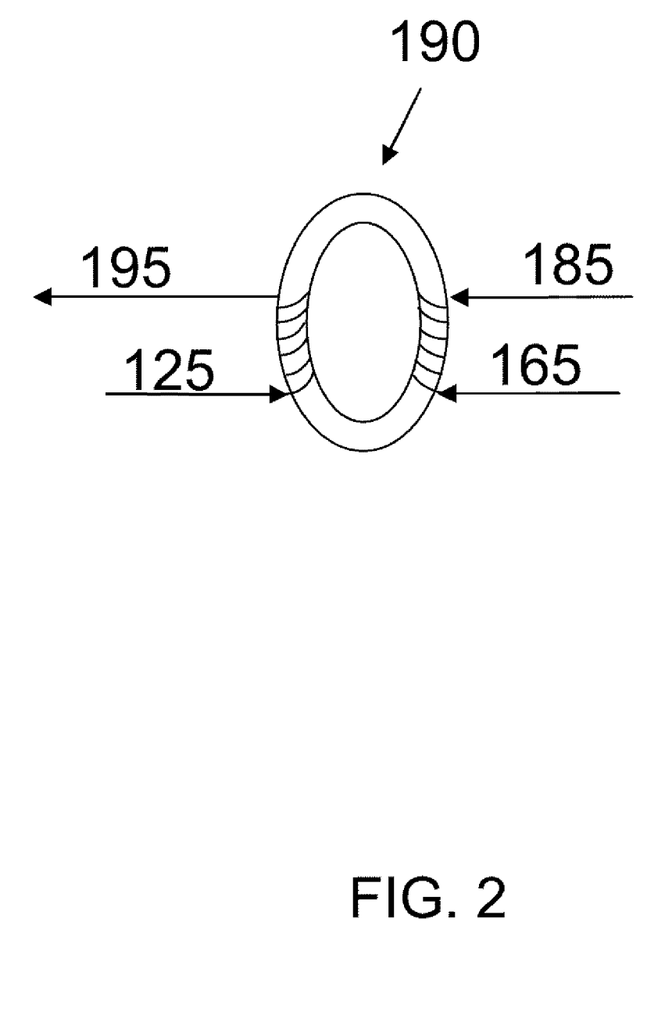
FIG. 2 is a schematic illustration of transformer connections used in conjunction with the apparatus of FIG. 1.

Details of the isolation transformer connections of FIG. 1 are shown in FIG. 2. Inputs to the isolation transformer 190 include a DC input 125 from multi-DC power supply 120, an AC input 185 from single-phase AC supply 180, and an AC neutral input 165. The DC input is connected to the secondary winding of the isolation transformer, while the AC inputs are connected to the primary winding. The combined DC+AC output 195 is connected to one of the two electrodes (e.g., upper electrode 142).

In each of the embodiments disclosed herein, the multi-DC power supply can include a negative DC output that is connected to the dispensing needle of the fiber-forming module, and a positive DC output that is connected to the electrodes. The negative DC output can range from −2 kV to −20 kV, and the positive DC output can range from +2 kV to +20 kV. In an embodiment, the negative DC output supplied to the dispensing needle is about −10 kV and the positive DC output supplied to the electrodes is about +5 kV. A single-phase AC power supply can include a 120V/60 Hz AC power supply. A three-phase AC power supply can include a 208V three-phase power supply.

Figure 3:
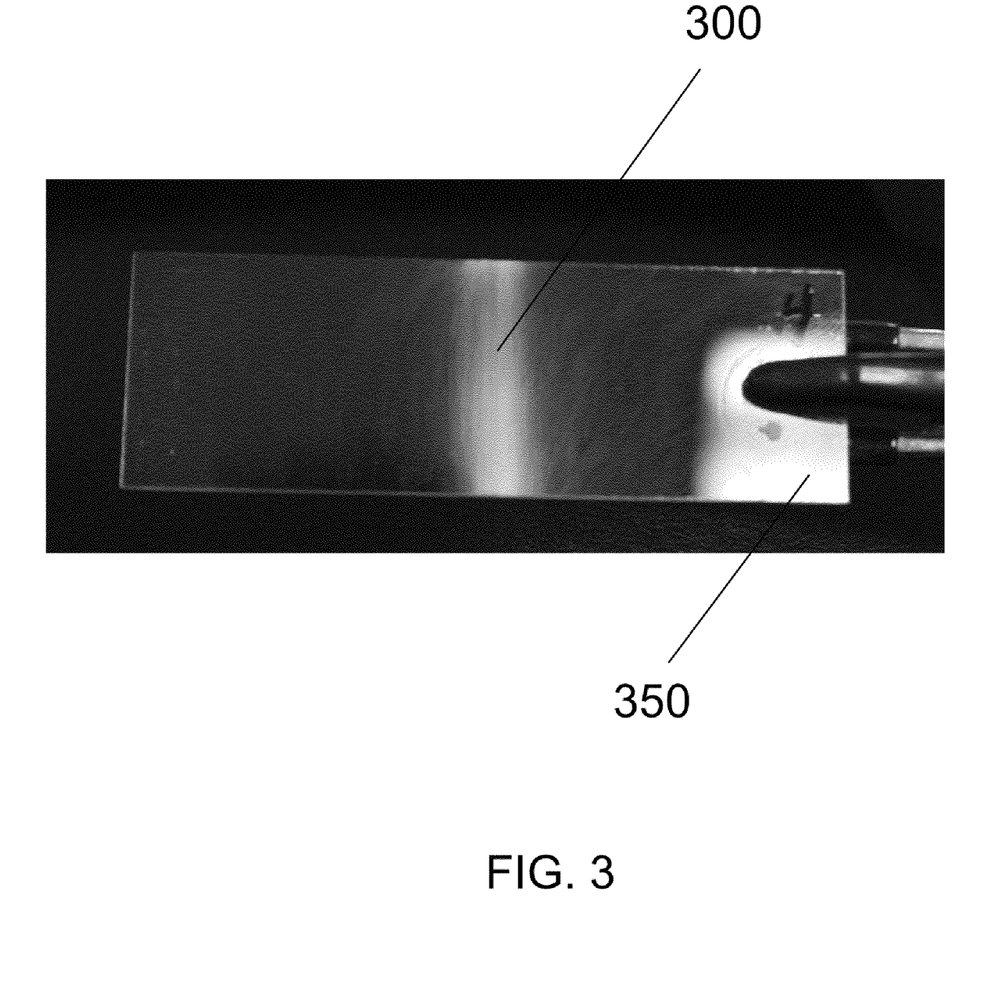
FIG. 3 is an optical photograph of linearly-aligned fibers.

FIG. 3 is an optical photograph of linearly-aligned fibers 300 on glass slide 350 that were obtained using the FIG. 1 apparatus after 15 seconds of fiber collection.

Figure 4:
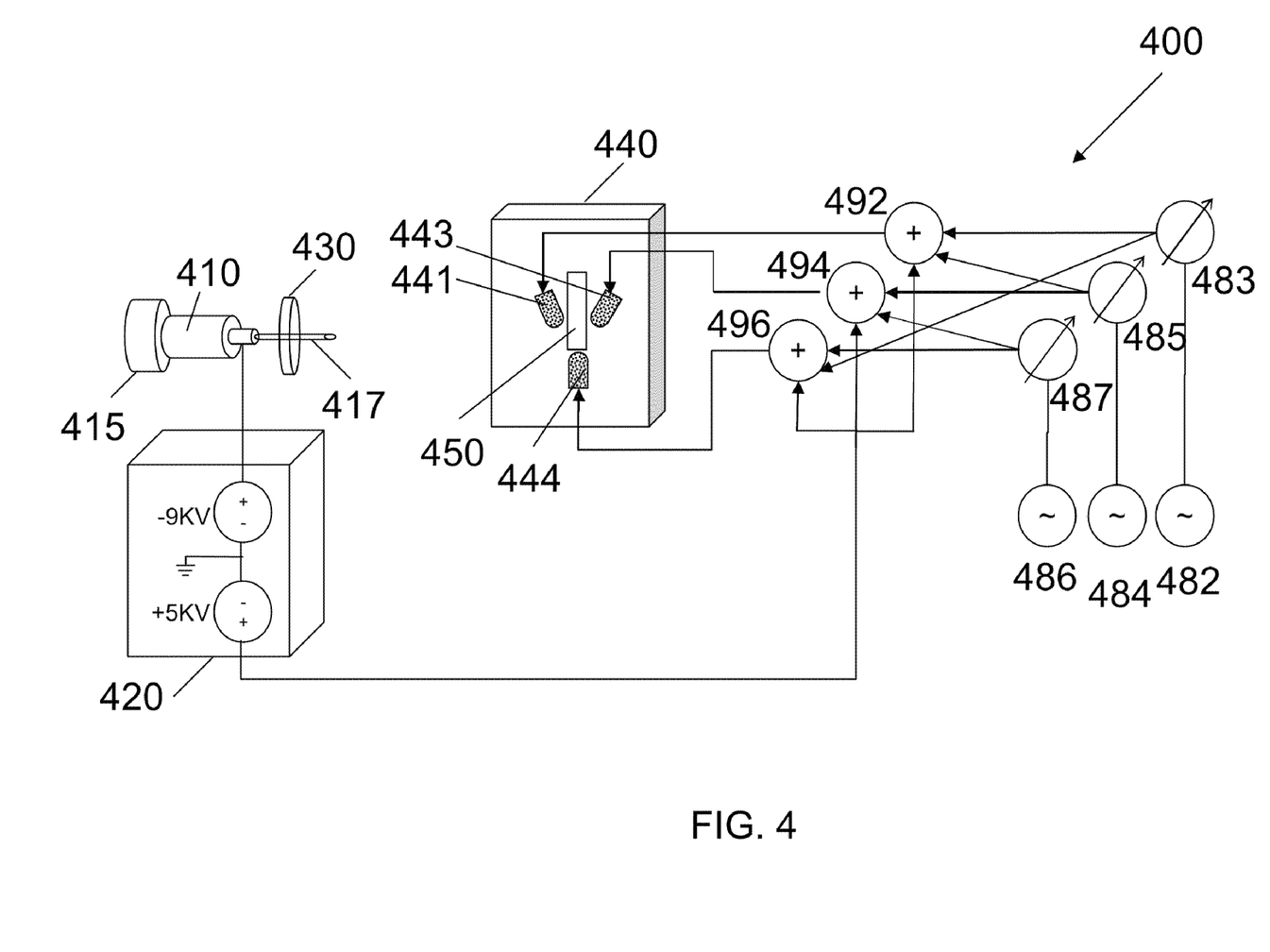
FIG. 4 is a schematic illustration of an electrospinning test setup used to form triangularly configured, linearly-aligned fibers.

FIG. 4 is a schematic illustration of an electrospinning test apparatus 400 used to form triangularly-configured, linearly-aligned fibers according to a further embodiment. As in the previous example, a liquid feedstock 410 is pumped using syringe pump 415 to dispensing needle 417 that is connected to a multi-DC power supply 420. The formed fiber 430 is drawn toward and travels to the collector 440. In this example, however, the collector comprises three electrodes: upper-left electrode 441, upper-right electrode 443, and lower electrode 444. By controlling the application of a 3 phase AC voltage signal to the electrodes, a triangular configuration of linearly-aligned fiber can be formed on glass substrate 450 that is positioned proximate to the electrodes. Specifically, as the 3 phase signal cycles among the electrodes, the fiber 430 is attracted to each of the respective electrodes 441, 443, 444 in succession such that the fiber, which is deposited on glass substrate 450 in a triangular pattern, is linearly-aligned between each electrode pair.

In FIG. 4, the multi-DC power supply 420 is connected to upper-left electrode 441, upper-right electrode 443, and lower electrode 444 via respective isolation transformers 492, 494, 496. A trio of 3 phase 208V AC power supplies 482, 484, 486 are also connected to upper-left electrode 441, upper-right electrode 443, and lower electrode 444 via respective variable transformers 483, 485, 487 and isolation transformers 492, 494, 496.

The aligned fiber production setup in FIG. 4 includes connections to the isolation transformers to achieve higher AC voltage levels. In contrast to the single-ended AC connection between the AC supply and isolation transformer used in FIG. 1, in the embodiment of FIG. 4, these connections include a differential input where two hot signals are attached to each transformer. That is, the respective inputs to the isolation transformers 492, 494, 496 comprise pair-wise permutations of the three distinct 3 phase outputs of AC power supplies 482, 484, 486. Using differential inputs, 208V 3 phase supplies are changed to 120/208V 3 phase power. This differential input method results in a transformation that is analogous to the "Y-Delta transformation" used in the 3 phase electrical power industry. Exemplary isolation transformer connections are shown schematically in FIG. 5.

Figure 5:
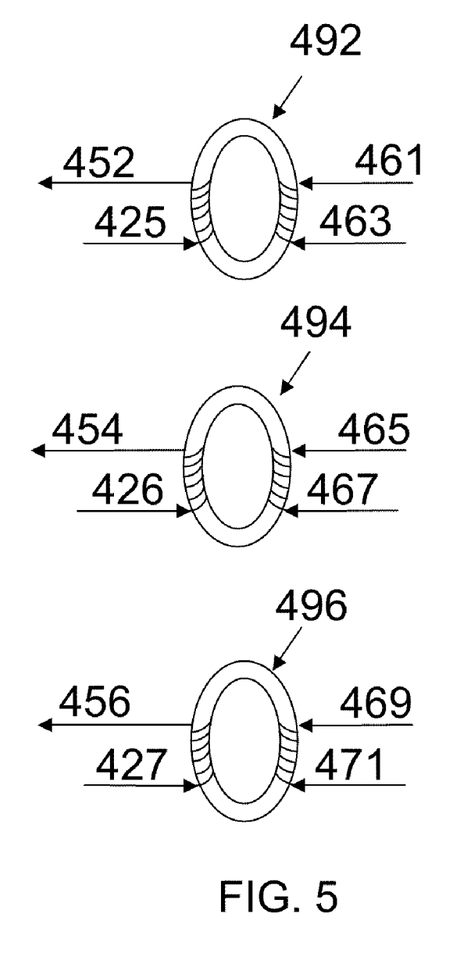
FIG. 5 is a schematic illustration of transformer connections used in conjunction with the apparatus of FIG. 4.

With reference to FIG. 5, inputs to isolation transformer 492 include a DC input 425 from multi-DC power supply 420, and a pair of out-of-phase AC inputs 461, 463 from 3 phase AC supplies 482, 484. Inputs to isolation transformer 494 include a DC input 426 from multi-DC power supply 420, and a pair of out-of-phase AC inputs 465, 467 from 3 phase AC supplies 484, 486. Inputs to isolation transformer 496 include a DC input 427 from multi-DC power supply 420, and a pair of out-of-phase AC inputs 469, 471 from 3 phase AC supplies 482, 486. In order to pass the DC signals to the electrodes, the DC inputs are connected to the secondary winding of each respective isolation transformer, while the AC inputs are connected to the respective primary windings. The combined DC+AC outputs 452, 454, 456 are connected to respective electrodes. The magnitude and phase of the inputs and outputs according to the present embodiment are summarized in Table 1.

TABLE 1

Isolation Transformer Inputs and Outputs

| Transformer | Inputs | | | Output |
| --- | --- | --- | --- | --- |
| | DC | AC | | DC + AC |
| 492 | +5 kV | 120 V ∠0° | 120 V ∠120° | 5 kV + 208 V ∠330° |
| 494 | +5 kV | 120 V ∠120° | 120 V ∠240° | 5 kV + 208 V ∠90° |
| 496 | +5 kV | 120 V ∠240° | 120 V ∠0° | 5 kV + 208 V ∠210° |

Figure 6:
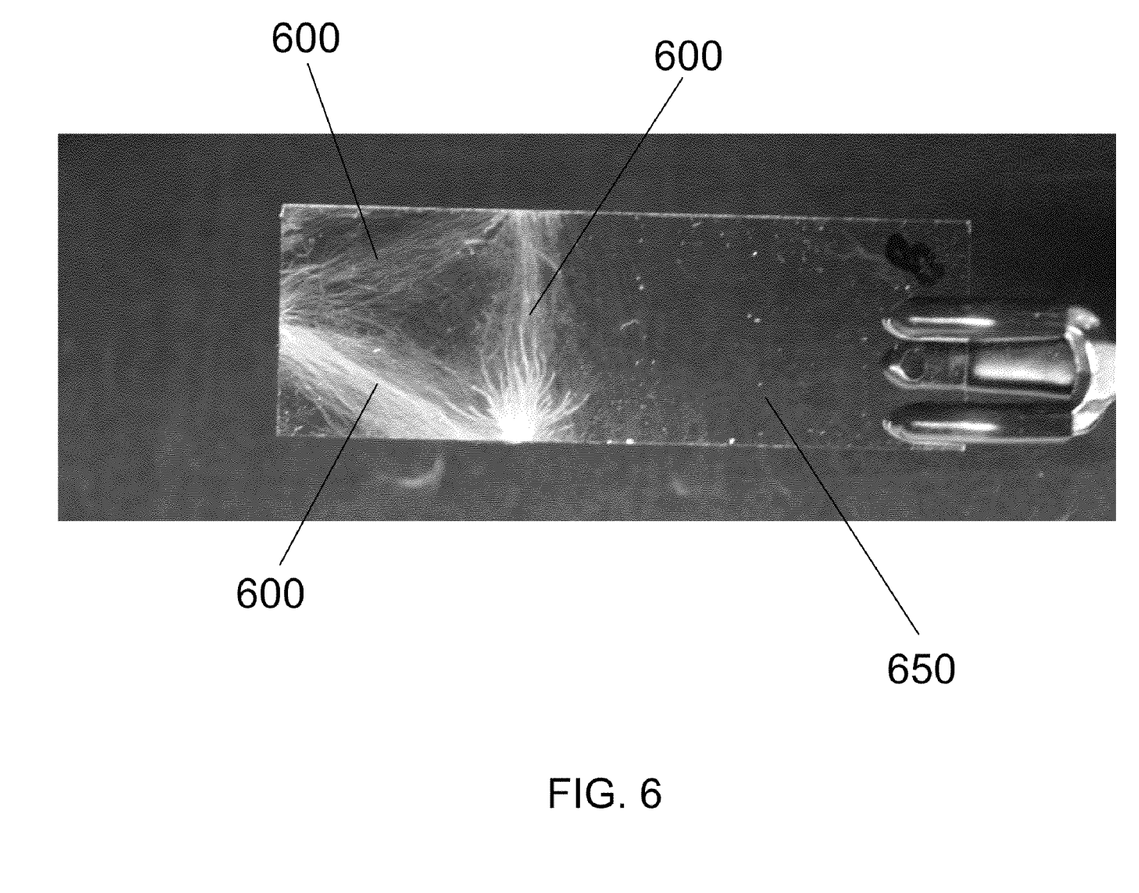
FIG. 6 is an optical photograph of triangularly configured, linearly-aligned fibers.

FIG. 6 is an optical photograph of aligned fibers 600 on glass slide 650 that were obtained using the apparatus of FIG. 4 after 15 seconds of fiber collection.

Figure 7:
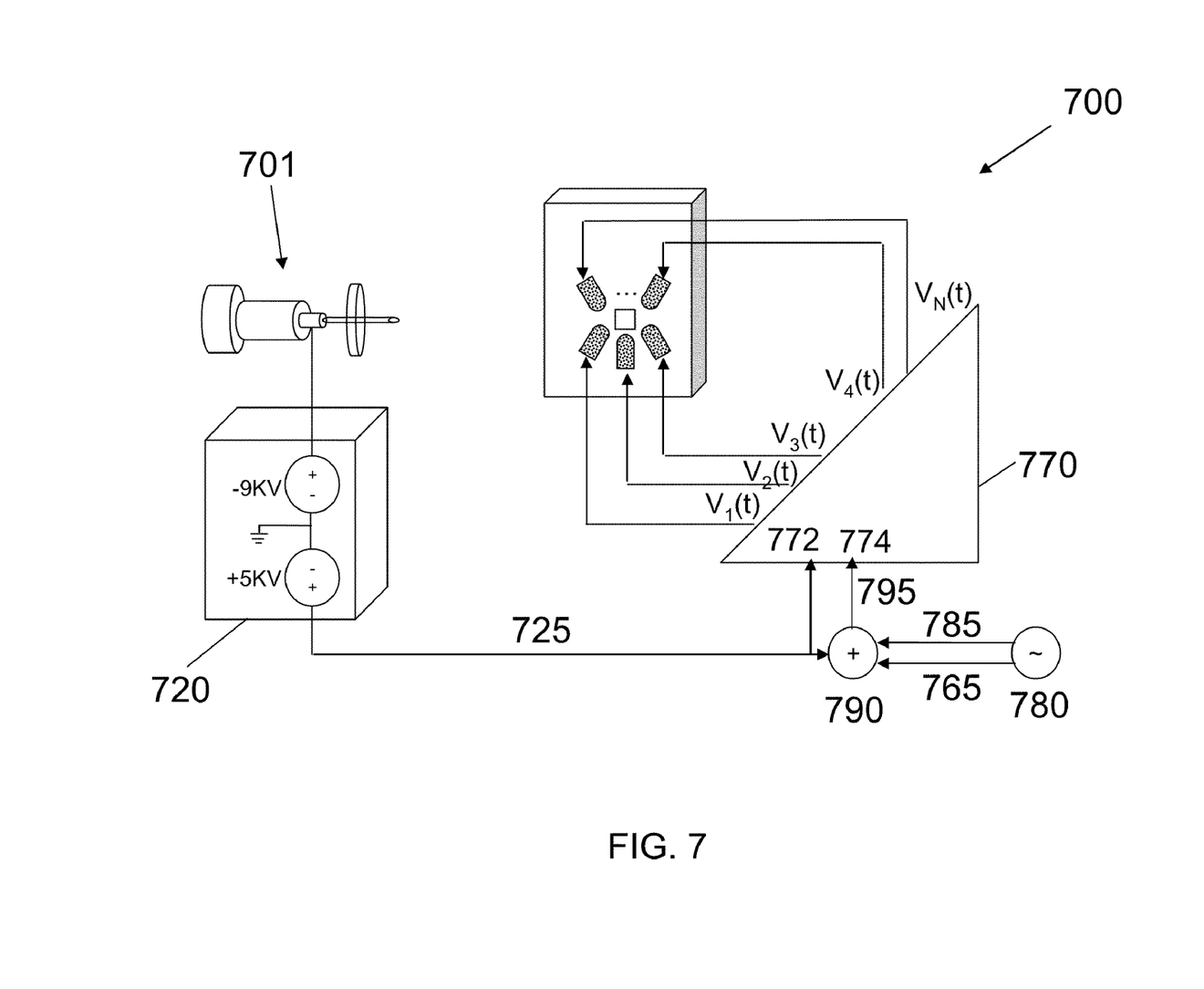
FIG. 7 is a schematic illustration of an electrospinning test setup using an arbitrary waveform generator.

A schematic illustration of an electrospinning test apparatus 700 used to form linearly-aligned fibers according to yet a further embodiment is shown in FIG. 7. Apparatus 700 comprises a fiber-forming module 701 and multi-DC power supply 720 as in the previous embodiments. The multi-DC power supply provides a high-voltage bias that is common to all electrodes, while an N-channel arbitrary waveform generator (AWG) 770 is used to generate the distinct low-voltage time-varying input to each electrode. The AWG is floated at high-voltage by (1) connecting its AC neutral input 772 to the multi-DC power supply 720, and (2) connecting its AC power input 774 to a single isolation transformer 790.

Figure 8:
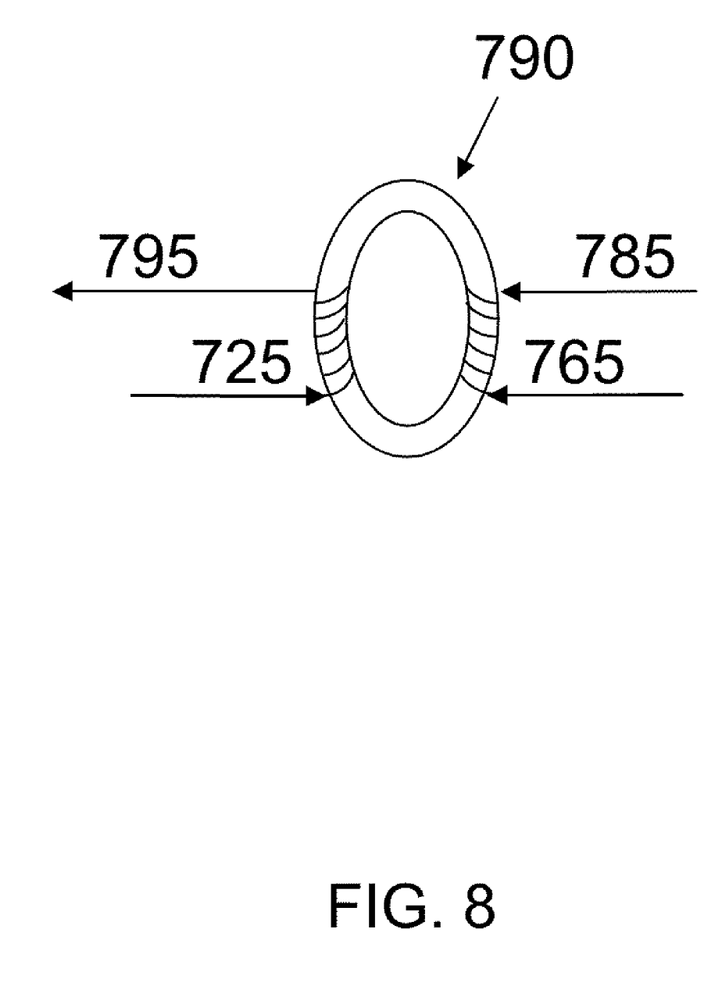
FIG. 8 is a schematic illustration of the transformer connections used in conjunction with the apparatus of FIG. 7.

Details of the isolation transformer connections of FIG. 7 are shown in FIG. 8. Inputs to the isolation transformer 790 include a DC input 725 from multi-DC power supply 720, an AC input 785 from single-phase AC supply 780, and an AC neutral input 765. The DC input is connected to the secondary winding of the isolation transformer, while the AC inputs are connected to the primary winding. The combined DC+AC output 795 is connected to each of the electrodes.

The experimental apparatus used to produce linearly-aligned fibers may comprise a custom enclosure to avoid high voltage exposure at the connections where the AC signals are scaled up using variable transformers, and where DC and AC signals are combined by isolation transformers.

In addition to the time-dependent (AC) signals, in each of the foregoing embodiments a DC bias voltage is concurrently applied to the electrodes to ensure that the electrodes are at all times more electrically attractive to the fibers than the experimental enclosure.

Identical process parameters were chosen for both the linear and triangular configuration of aligned fibers. For the experiments disclosed herein, 27 AWG needles having an inner diameter of 0.21 mm were used. The pump flow rate was 0.5 ml/hr. Fiber diameters can be controlled by controlling one or more of the liquid feedstock composition, dispense rate, needle geometry, applied voltages and electrode configuration. Although glass substrates were used for fiber collection, any one of a variety of different collection substrates can be used. The collection substrate can be omitted so that the fibers are collected in free space.

The liquid feedstock can include organic or inorganic materials or combinations thereof Examples of liquids suitable for electrospinning include molten pitch, polymer solutions and melts, polymers that are precursors to ceramics, and/or molten glassy substances. Example polymers include polyimides, polyesters, fluoropolymers, polyolefins, and nylon.

Microfibers and nanofibers that are produced using the processes and apparatus described herein may include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), proteins, SEBS copolymer, silk, and styrene/isoprene copolymer.

Additionally, polymer blends can also be produced. Examples include poly(vinylidene fluoride)-poly(methyl methacrylate), polystyrene-poly(vinylmethylether), poly(methyl methacrylate)-poly(ethyleneoxide), poly(hydroxypropyl methacrylate)-poly(vinylpyrrolidone), poly(hydroxybutyrate)-poly(ethylene oxide), protein-polyethyleneoxide, polylactide-polyvinylpyrrolidone, polystyrene-polyester, polyester-poly(hyroxyethyl methacrylate), poly(ethylene oxide)-poly(methyl methacrylate), and poly(hydroxystyrene)-poly(ethylene oxide). By using post treatment annealing, carbon fibers can be obtained from electrospun polymer fibers.

One advantage of the process is the robustness and flexibility of the alignment configuration. The alignment is considered robust because, in contrast to conventional fiber alignment technologies, which rely on the collected fiber having specific properties to obtain a specific fiber alignment pattern, the degree of alignment is not strongly dependent on the fiber material being deposited. The alignment is considered flexible because the number of collector electrodes can be chosen to achieve a desired alignment configuration. In addition to linear and triangular configurations, higher-order configurations, such as square, pentagonal, etc., are also feasible.

An average diameter of individual aligned fibers can range from about 0.1 micron to 2 microns (e.g., 0.1, 0.2, 0.5, 1 or 2 microns). In an embodiment, the average fiber diameter ranges from about 0.4 to 1 micron.

One application for electrospun fibers made using the claimed process is in diesel particulate filters. Diesel particulate filters typically comprise alumina micro-fibers, and a low-cost process for manufacturing these fibers would be beneficial. In such particulate filter applications, the alumina microfibers are advantageously aligned to avoid coalescence that results from certain fiber-fiber contact.

In addition to filtration applications, additional applications for electrospun fibers include optical fibers, optical polarizers, catalyst substrates, thermoelectrics, and structural reinforcement. Alignment capability is explicitly required for certain applications such as optical polarizers, but it also expands applicability of the electrospinning process by offering benefits for applications that do not explicitly require alignment. These benefits include preventing the merging of fibers by reducing contact between fibers, and allowing the deposited fibers to be cut to uniform lengths.

As used herein, the singular forms "a," "an" and "the" include plural referents unless the context clearly dictates otherwise. Thus, for example, reference to a "fiber" includes examples having two or more such "fibers" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "adapted" or "configured" in a particular way. In this respect, such a component is "adapted" or "configured" to embody a particular property, or function in a particular manner, where such recitations are structural recitations as opposed to recitations of intended use. More specifically, the references herein to the manner in which a component is "adapted" or "configured" denotes an existing physical condition of the component and, as such, is to be taken as a definite recitation of the structural characteristics of the component.

Examples

The invention will be further clarified by the following examples.

An exemplary liquid feedstock comprises 1.95 g titanium (IV) propoxide, 1.65 g polyvinyl pyrrolidone (PVP), 100 mg Pluronic® P-123, 292.5 mg tantalum butoxide, 8.0 ml dimethylformamide (DMF), 3.0 ml tetrahydrofuran (THF), 1.0 ml acetylacetone and ammonium hydroxide.

The foregoing liquid feedstock composition is prepared by initially dissolving the titanium propoxide, Pluronic® P-123 and tantalum butoxide in a mixture of the DMF and THF. The combined mixture is stirred (~1 hour) to form a homogeneous solution. Next, the PVP is added and the mixture stirred until the PVP is completely dissolved (~24 hrs.). Finally, approximately 2 drops of ammonium hydroxide is added followed immediately by addition of 1 ml of acetyl acetone to prevent gelation. The thus formed liquid feedstock is stirred an additional 24 hrs prior to use.

Fibers resulting from the experiments disclosed herein have a mean diameter of 0.492 microns (standard deviation of 0.085 microns), with minimum and maximum values of 0.410 microns and 0.615 microns, respectively.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for forming aligned electrospun fibers, said method comprising:
    forming a fiber stream comprising an electrically conductive fluid, the fiber stream being formed by a fiber-forming module that is biased at a first DC voltage;
    directing the fiber stream at a collector, the collector comprising a plurality of electrodes each electrically biased at a second DC voltage of from about 2 to 20 kV;
    attracting the fiber stream to successive ones of the electrodes by applying a time-dependent voltage to at least one of the electrodes; and
    depositing the fiber stream between successive pairs of the electrodes such that the deposited fibers are aligned between respective electrode pairs, wherein the time-dependent voltage is a 120V/60 Hz single-phase AC voltage.

2. The method according to claim 1, wherein a product of the first DC voltage and the second DC voltage is negative.

3. The method according to claim 1, wherein the collector further comprises a substrate positioned proximate to the electrodes and the depositing comprises depositing the fibers on the substrate.

4. The method according to claim 1, wherein the fiber stream is directed substantially horizontally toward the collector.

5. The method according to claim 1, wherein the fiber stream is directed substantially vertically toward the collector.

6. The method according to claim 1, wherein the collector comprises a first electrode and a second electrode, the first electrode being connected to a single-phase AC power supply via a variable transformer and an isolation transformer.

7. The method according to claim 1, wherein the aligned fibers have an average diameter of between 0.1 and 2 microns.

8. The method according to claim 1, wherein the aligned fibers have an average diameter of between 0.4 and 1 micron.

9. A method for forming aligned electrospun fibers, said method comprising:
    forming a fiber stream comprising an electrically conductive fluid, the fiber stream being formed by a fiber-forming module that is biased at a first DC voltage;
    directing the fiber stream at a collector, the collector comprising a plurality of electrodes each electrically biased at a second DC voltage of from about 2 to 20 kV;
    attracting the fiber stream to successive ones of the electrodes by applying a time-dependent voltage to at least one of the electrodes; and
    depositing the fiber stream between successive pairs of the electrodes such that the deposited fibers are aligned between respective electrode pairs, wherein the time-dependent voltage is a 208V three-phase AC voltage.

10. The method according to claim 1, wherein the second DC voltage is continuously applied to the electrodes during the acts of directing, attracting and depositing.

11. The method according to claim 9, wherein the collector comprises a first electrode, a second electrode and a third electrode, each of the electrodes being connected to a DC power supply and to a three-phase AC power supply via a respective variable transformer and a respective isolation transformer.

12. The method according to claim 11, wherein the three-phase AC power supply includes a first, a second, and a third phase signal and the first isolation transformer is connected to the first and second phase signals, the second isolation transformer is connected to the second and the third phase signals, and the third isolation transformer is connected to the first and third phase signals.

* * * * *